US009524588B2

(12) United States Patent
Barzuza et al.

(10) Patent No.: US 9,524,588 B2
(45) Date of Patent: Dec. 20, 2016

(54) ENHANCED COMMUNICATION BETWEEN REMOTE PARTICIPANTS USING AUGMENTED AND VIRTUAL REALITY

(71) Applicant: Avaya Inc., Basking Ridge, NJ (US)

(72) Inventors: Tamar Barzuza, Tel Aviv (IL); Yair Wiener, Qiryat Ono (IL); Ori Modai, Ramat-Hasharon (IL); Azaria Cohen, Maale Ievona (IL)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/585,399

(22) Filed: Dec. 30, 2014

(65) Prior Publication Data

US 2015/0215581 A1  Jul. 30, 2015

Related U.S. Application Data (60) Provisional application No. 61/931,234, filed on Jan. 24, 2014.

(51) Int. Cl.
| | |
|---|---|
| *H04N 7/15* | (2006.01) |
| *G06T 19/00* | (2011.01) |
| *G06F 3/0484* | (2013.01) |
| *H04L 29/06* | (2006.01) |
| *H04N 13/04* | (2006.01) |

(Continued)

(52) U.S. Cl.
CPC ......... *G06T 19/006* (2013.01); *G06F 3/04842* (2013.01); *H04L 12/18* (2013.01); *H04L 12/1827* (2013.01); *H04L 65/403* (2013.01); *H04L 67/38* (2013.01); *H04N 7/15* (2013.01); *H04N 7/157* (2013.01); *H04N 13/0429* (2013.01); *G02B 27/01* (2013.01); *G02B 27/017* (2013.01); *G02B 2027/014* (2013.01); *G02B 2027/0178* (2013.01)

(58) Field of Classification Search
CPC .............................. H04N 7/15; H04N 13/0429
USPC ............ 345/7, 8, 157, 633, 427; 348/14.07, 348/14.09, 14.1, 14.08, 14.16, 143, 207.1; 359/630; 434/271, 350; 463/6; 704/275; 709/203, 204; 381/309; 382/103; 715/700, 715/757; 235/375; 370/254
See application file for complete search history.

(56) References Cited

U.S. PATENT DOCUMENTS 4,400,724 A * 8/1983 Fields ................. H04L 12/1813
348/14.1
5,272,526 A * 12/1993 Yoneta ..................... H04N 7/15
348/14.1

(Continued)

FOREIGN PATENT DOCUMENTS

| KR | 20110066298 A | 6/2011 |
| WO | 2012135554 A1 | 10/2012 |

*Primary Examiner* — Gerald Gauthier (57) ABSTRACT

Embodiments disclosed herein provide methods, systems, and computer readable storage media for facilitating enhanced visual communication between remote participants. In a particular embodiment, a method provides, during a conference session, receiving first video captured of a first participant remote to a physical meeting location. The method further provides determining a first position for the first participant in the physical meeting location and determining a view of an Augmented Reality (AR) head mounted display worn by a second participant at the physical meeting location. From the first video, the method provides generating AR video that makes the first participant appear to the second participant at the first position when viewed through the AR head mounted display. The method also includes transferring the AR video to the AR head mounted display for presentation to the second participant.

18 Claims, 8 Drawing Sheets

(51) Int. Cl.
*H04L 12/18* (2006.01)
*G02B 27/01* (2006.01)

(56) References Cited

U.S. PATENT DOCUMENTS

| | | | | |
|---|---|---|---|---|
| 5,534,914 A * | 7/1996 | Flohr | H04N 7/15 | |
| | | | 348/14.01 | |
| 5,572,248 A * | 11/1996 | Allen | H04M 3/56 | |
| | | | 348/14.1 | |
| 5,745,161 A * | 4/1998 | Ito | H04N 7/15 | |
| | | | 348/14.09 | |
| 6,330,022 B1 * | 12/2001 | Seligmann | H04N 7/147 | |
| | | | 348/14.08 | |
| 6,409,599 B1 | 6/2002 | Sprout et al. | | |
| 6,545,700 B1 * | 4/2003 | Monroe | H04M 3/567 | |
| | | | 348/14.07 | |
| 6,583,808 B2 | 6/2003 | Boulanger et al. | | |
| 6,847,336 B1 * | 1/2005 | Lemelson | A61B 1/00048 | |
| | | | 345/8 | |
| 7,050,078 B2 * | 5/2006 | Dempski | G01S 3/7864 | |
| | | | 345/7 | |
| 7,057,582 B2 * | 6/2006 | Ebersole, Jr. | A62B 9/006 | |
| | | | 345/7 | |
| 7,340,399 B2 * | 3/2008 | Friedrich | G06F 3/013 | |
| | | | 704/275 | |
| 7,346,654 B1 * | 3/2008 | Weiss | H04N 7/15 | |
| | | | 348/E7.083 | |
| 7,764,247 B2 * | 7/2010 | Blanco | G01C 21/365 | |
| | | | 345/7 | |
| 7,990,889 B2 * | 8/2011 | Beers | H04L 12/1822 | |
| | | | 370/254 | |
| 8,612,511 B2 * | 12/2013 | Friedrich | G05B 19/409 | |
| | | | 709/203 | |
| 8,619,005 B2 * | 12/2013 | Cok | G02B 27/0172 | |
| | | | 345/178 | |
| 8,643,951 B1 * | 2/2014 | Wheeler | G06F 3/012 | |
| | | | 359/630 | |
| 8,690,581 B2 * | 4/2014 | Ruf | G09B 23/28 | |
| | | | 434/262 | |
| 8,758,136 B2 | 6/2014 | Briggs et al. | | |
| 8,767,014 B2 * | 7/2014 | Vaught | G02B 27/017 | |
| | | | 345/633 | |
| 8,767,306 B1 * | 7/2014 | Miao | G02B 27/0172 | |
| | | | 359/629 | |
| 8,780,014 B2 * | 7/2014 | Border | G02B 27/017 | |
| | | | 345/7 | |
| 8,786,675 B2 | 7/2014 | Deering | | |
| 8,888,576 B2 | 11/2014 | Briggs et al. | | |
| 8,912,979 B1 * | 12/2014 | Gomez | G09G 3/001 | |
| | | | 345/7 | |
| 9,035,878 B1 * | 5/2015 | Wheeler | G06F 3/0484 | |
| | | | 345/156 | |
| 9,047,698 B2 * | 6/2015 | Maciocci | G06F 3/011 | |
| 9,111,498 B2 * | 8/2015 | Border | G09G 3/3611 | |
| 9,152,226 B2 * | 10/2015 | Forutanpour | G06F 3/011 | |
| 9,153,043 B1 * | 10/2015 | Prada Gomez | G06T 11/00 | |
| 9,311,742 B1 | 4/2016 | Glover et al. | | |
| 2002/0158873 A1 * | 10/2002 | Williamson | G06T 7/002 | |
| | | | 345/427 | |
| 2003/0067536 A1 | 4/2003 | Boulanger et al. | | |
| 2004/0104935 A1 * | 6/2004 | Williamson | G06F 3/012 | |
| | | | 715/757 | |
| 2007/0279484 A1 * | 12/2007 | Derocher | H04N 7/15 | |
| | | | 348/14.09 | |
| 2009/0189974 A1 | 7/2009 | Deering | | |
| 2011/0085018 A1 * | 4/2011 | Culbertson | H04L 12/1827 | |
| | | | 348/14.08 | |
| 2011/0211036 A1 * | 9/2011 | Tran | H04N 5/23238 | |
| | | | 348/14.08 | |
| 2012/0024959 A1 | 2/2012 | Minagawa et al. | | |
| 2012/0038742 A1 * | 2/2012 | Robinson | H04N 7/142 | |
| | | | 348/14.16 | |
| 2012/0046072 A1 | 2/2012 | Choi | | |
| 2012/0046768 A1 | 2/2012 | Raoufi | | |
| 2012/0170800 A1 * | 7/2012 | da Silva Frazao | G06F 3/011 | |
| | | | 382/103 | |
| 2012/0197991 A1 * | 8/2012 | Ramani | H04N 7/15 | |
| | | | 709/204 | |
| 2012/0204120 A1 * | 8/2012 | Lefar | G06Q 10/109 | |
| | | | 715/757 | |
| 2012/0249591 A1 | 10/2012 | Maciocci et al. | | |
| 2012/0262537 A1 * | 10/2012 | Baker | H04N 7/152 | |
| | | | 348/14.08 | |
| 2012/0274736 A1 * | 11/2012 | Robinson | H04N 7/15 | |
| | | | 348/14.16 | |
| 2012/0281059 A1 * | 11/2012 | Chou | H04N 7/15 | |
| | | | 348/14.07 | |
| 2013/0076853 A1 * | 3/2013 | Diao | H04N 7/157 | |
| | | | 348/14.08 | |
| 2013/0141573 A1 * | 6/2013 | Sutter | H04N 7/183 | |
| | | | 348/143 | |
| 2013/0194304 A1 | 8/2013 | Latta et al. | | |
| 2013/0303248 A1 * | 11/2013 | Williams | A63F 9/143 | |
| | | | 463/6 | |
| 2014/0063178 A1 * | 3/2014 | Krans | H04N 7/142 | |
| | | | 348/14.08 | |
| 2014/0104368 A1 * | 4/2014 | Tan | H04N 7/147 | |
| | | | 348/14.07 | |
| 2014/0117073 A1 * | 5/2014 | Bell | H04L 12/1818 | |
| | | | 235/375 | |
| 2014/0240444 A1 * | 8/2014 | Szymczyk | H04L 12/1827 | |
| | | | 348/14.07 | |
| 2014/0300758 A1 * | 10/2014 | Tran | H04N 5/225 | |
| | | | 348/207.1 | |
| 2015/0215581 A1 * | 7/2015 | Barzuza | G02B 27/017 | |
| | | | 348/14.1 | |
| 2015/0312520 A1 * | 10/2015 | Nohria | G09B 5/06 | |
| | | | 434/350 | |

* cited by examiner

ENHANCED COMMUNICATION BETWEEN REMOTE PARTICIPANTS USING AUGMENTED AND VIRTUAL REALITY

RELATED APPLICATIONS

This application is related to and claims priority to U.S. Provisional Patent Application No. 61/931,234, entitled "Visual communication in augmented reality," filed on Jan. 24, 2014, and which is hereby incorporated by reference in its entirety.

TECHNICAL BACKGROUND

Conference call systems have long facilitated audio communications between participants at different locations. More recently some conference systems allow real-time video communications between participants. This allows a participant at one location to view live video and audio of other participants speaking even though those other participants may be very far away. Being able to view the other participants allows for a more productive conference as the participants can view each other's facial expressions, gestures, or other visual information that cannot be seen during an audio call.

While video conferencing has surely enhanced experience of remotely located participants, video conferencing falls short of making remote participants feel as though they are all in the same room. That is, participants sitting in a conference room watching other participants on a display screen does not adequately simulate those other participants being within the conference room. However, virtual reality headsets are now available that visually immerse users in visual experiences, such as video games. Similarly, augmented reality headsets are able to display information to a user while that user is still able to view the scene around them.

OVERVIEW

Embodiments disclosed herein provide methods, systems, and computer readable storage media for facilitating enhanced visual communication between remote participants. In a particular embodiment, a method provides, during a conference session, receiving first video captured of a first participant remote to a physical meeting location. The method further provides determining a first position for the first participant in the physical meeting location and determining a view of an Augmented Reality (AR) head mounted display worn by a second participant at the physical meeting location. From the first video, the method provides generating AR video that makes the first participant appear to the second participant at the first position when viewed through the AR head mounted display. The method also includes transferring the AR video to the AR head mounted display for presentation to the second participant.

In some embodiments, the method further comprises receiving second video captured of the physical meeting location, determining a second position in the physical meeting location for a third participant remote to the physical meeting location, and, from the first video and the second video, generating Virtual Reality (VR) video that presents the physical or virtual meeting room with the first participant at the first position from a view point of the second position. The method further includes transferring the VR video to a VR head mounted display worn by the third participant for presentation to the third participant.

In some embodiments, generating the AR video further makes a representation of the third participant appear to the second participant at the second position when viewed through the AR head mounted display.

In some embodiments, the method further comprises receiving first audio captured of the first participant in conjunction with the first video and transferring the first audio to an audio device at the physical meeting location, wherein the audio device presents the first audio such that the second participant hears audio as coming substantially from the first position.

In some embodiments, determining the view of the AR head mounted display comprises receiving orientation information from the AR head mounted display, receiving position information about the second participant from sources external to the AR head mounted display, and identifying the view of the AR head mounted display based on the orientation information and the position information.

In some embodiments, determining the view of the AR head mounted display includes receiving subsequent orientation information and subsequent position information and updating the view of the AR head mounted display based on the subsequent orientation information and the subsequent position information.

In some embodiments, the method further includes recording the conference session from at least one of the views of the AR head mounted display and another view of the physical meeting location.

In some embodiments, the method includes translating the recording into a format viewable on a non-head mounted display.

In some embodiments, generating the AR video further comprises overlaying additional visual information associated with the conference session such that the additional visual information appears to the second participant at a position within the physical meeting location when viewed through the AR head mounted display.

In another embodiment, a conferencing system comprising a communication interface and processing circuitry is provided. The communication interface is configured to, during a conference session, receive first video captured of a first participant remote to a physical meeting location. The processing circuitry is configured to determine a first position for the first participant in the physical meeting location, determine a view of an Augmented Reality (AR) head mounted display worn by a second participant at the physical meeting location, and, from the first video, generate AR video that makes the first participant appear to the second participant at the first position when viewed through the AR head mounted display. The communication interface configured to transfer the AR video to the AR head mounted display for presentation to the second participant.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
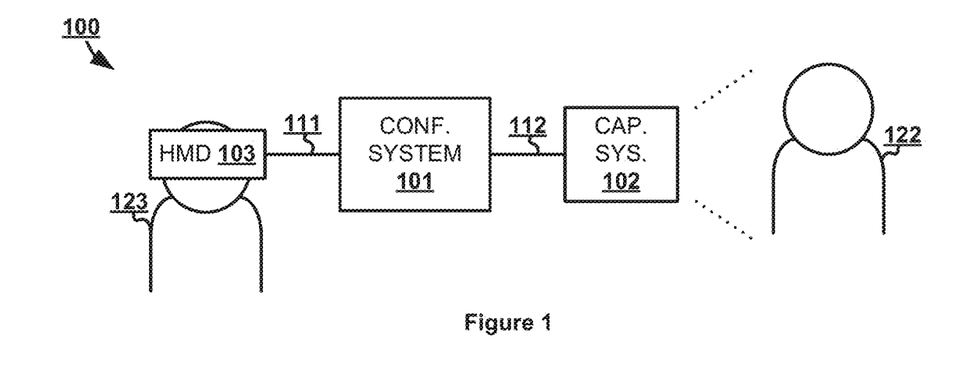
FIG. 1 illustrates a conferencing environment for facilitating enhanced visual communication between remote participants.

FIG. 1 illustrates conferencing environment 100. Conferencing environment 100 includes conferencing system 101, participant capture system 102, and Augmented Reality (AR) head mounted display (HMD) 103. Conferencing system 101 and participant capture system 102 communicate over communication link 112. Conferencing system 101 and AR HMD 103 communicate over communication link 111.

In operation, conferencing system 101 is configured to provide a conferencing experience to conferencing participants at different locations as though the participants are at the same location. To do this, conferencing system 101 uses AR, which allows a participant to see the world around them while overlaying additional information. In some AR devices, such as a smartphone, the device captures video images and displays those images on a screen in a manner similar to using the screen as a viewfinder for a camera. AR information is overlaid on the displayed screen images in relation to what is displayed in the image. For example, information about a business having a storefront captured in the image may be displayed on the screen next to the storefront. In another example, a person in the AR view may have information displayed nearby the person, such as business card type information, so that it can easily be referenced. Alternatively, the AR information may be displayed on a see through medium, such as transparent lenses, which obviate the need to display the images that can be seen through the lenses.

For the purposes of facilitating a conference, conferencing system 101 uses AR video to overlay captured video of conference participants not co-located with the participant viewing the AR video. For example, participant 123 is located in a meeting room while participant 122 is not. Participant 122 may be in a room down the hall for the meeting room or may be on the other side of the world. Regardless of where participant 122 is located, AR HMD 103, worn by participant 123, in conjunction with conferencing system 101 and capture system 102 allows participant 123 to view participant 122 at a position in the meeting room. Thus, rather than merely viewing video captured of participant 122 on a display, participant 123 can "see" participant 122 in the meeting room thereby emulating the experience of participant 122 actually being in the room.

Figure 2:
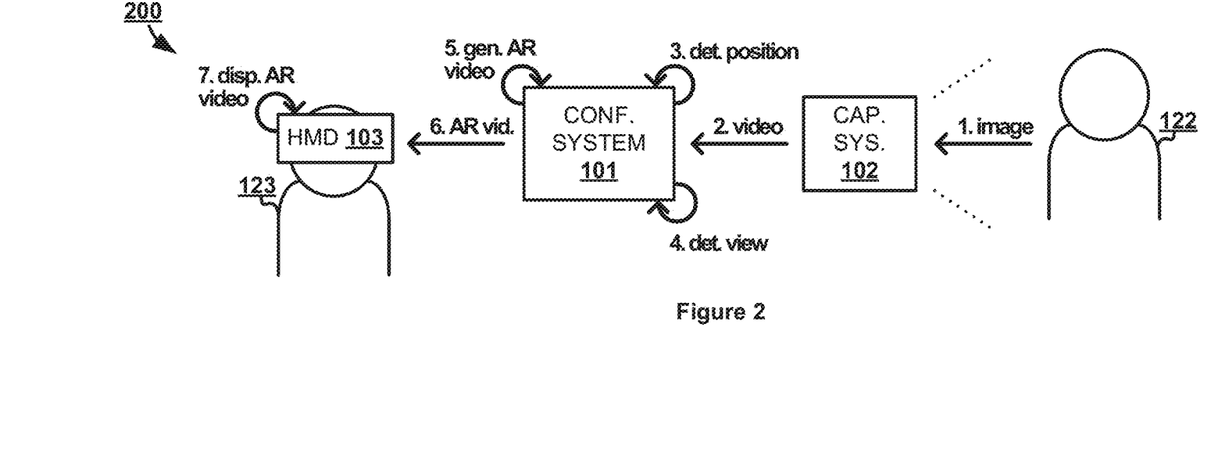
FIG. 2 illustrates an operational scenario of a conferencing environment for facilitating enhanced visual communication between remote participants.

FIG. 2 illustrates operation 200 of conferencing environment 100 to facilitate enhanced visual communication between remote participants. In operation 200, video images are captured of participant 122 by capture system 102 at step 1. The video images may be captured in two dimensions or three depending on the capabilities of capture system 102, HMD 103, conferencing system 101 or otherwise. After capture, video of the captured video images is transferred in real time to conferencing system 101 (step 2). The video may be transferred in any format supported by capture system 102 and conferencing system 101. The video may be transferred over one or more various wired or wireless networks (local area, wide area, the Internet, cellular data network, and the like) or direct links depending on how far removed capture system 102 is from conferencing system 101.

At step 3, conferencing system 101 determines a position for the AR representation of participant 122 in the meeting location where participant 123 is located. Step 4 may be performed at any time before the representation of participant 122 is presented to participant 123 in HMD 103 and does not necessarily need to be performed after steps 1 and 2. Conferencing system 101 may determine the position based on information received from HMD 103, other devices or sensors at the meeting location, participant 123, a meeting administrator, or any other source of potential position information. Using the information at its disposal, conferencing system 101 therefore determines a position within the meeting location where participant 122 could be physically located if participant 122 were at the meeting location.

For example, if the meeting location includes a conference table, then conferencing system 101 may determine the position of participant 122 to be an empty seat at the conference table. The presence of the empty seat may be determined based on video captured from HMD 103 (e.g. analyzing the video to determine the presence of a person at each position), based on information manually entered by a participant or an administrator when deploying the system for a conference session (e.g. manually map the meeting room for locations of participants, chairs, etc.), based on pressure sensors in chairs at the table, or by any other means.

Conferencing system 101 further determines a view of participant 123 at step 4. The view of participant 123 needs to be determined in order to determine where the position of participant 122 is relative to participant 123's view. The view may be determined by analyzing video captured from HMD 103, video captured of participant 123 in the meeting location, orientation sensors of HMD 103 (e.g. accelerometers, compass, gyroscopes, etc.), or any other information that can be used to determine the view of a participant.

Once the position of participant 122 and the view of participant 123 are determined, conferencing system 101 can generate AR video at step 5, which will be displayed to participant 123 in HMD 103. The AR video may be generated in either 2D or 3D depending on the capabilities of HMD 103 and how participant 122 was captured. To generate the AR video, conferencing system 101 may remove any background images in the video captured of participant 122 so only participant 122 and things participant 122 is holding, using, or otherwise beneficial to the conference session remains. Conferencing system 101 may manipulate the video image of participant 122 so that it looks as though participant 122 is at the position determined in step 3 from the view of participant 123 through HMD 103. For example, the image of participant 122 may be reduced in size in the AR video if the position farther away in the view of participant 123. Moreover, the image of participant 122 may be rotated based on the angle in which participant 122 is viewed from the view of participant 123. That is, participant 122's position at the meeting location may mean that participant 122's side is facing the view of participant 123. Depending on whether the video of participant 122 was captured from the side, conferencing system 101 may need to estimate what participant 122 looks like from the side when presenting participant 122 to participant 123. Alternatively, conferencing system 101 may simply continue to present the front of participant 122 even though that may not be how participant 123 would view participant 122 if participant 122 were present at the location. Additionally, conferencing system 101 may have to account for occlusions, such as other persons, plants, or other objects) in the view from participant 123 to participant 122.

After conferencing system 101 has generated the AR video, the AR video is transferred to HMD 103 at step 6. The AR video may be transferred over one or more various wired or wireless networks (local area, wide area, the Internet, cellular data network and the like) or direct links depending on how far removed capture system 102 is from conferencing system 101. In some examples, conferencing system 101 may be located at the meeting location. Upon receiving the AR video, HMD 103 displays the AR video to participant 123. If HMD 103 uses transparent lenses, then the AR video comprises video of participant 122 at the determined position in the meeting room as displayed on the transparent lenses. Alternatively, if HMD 103 comprises a non-transparent display that displays video captured from the viewpoint of participant 123 (e.g. "viewfinder"), then the AR video is overlaid onto that captured video when displayed back to participant 123.

Steps 1-2 and 4-7 occur continually during a meeting to present participant 122 to participant 123 in a best effort to emulate participant 122's presence at the meeting location with participant 123. Step 3 may only occur once unless conference system 101 determines that participant 122 should change positions during the meeting. As participant 123 changes their orientation with HMD 103 (e.g. turns their head, moves positions in the meeting location, etc.), those changes in orientation are accounted for at steps 4 and 5 to generate AR video that displays participant 122 at the determined position regardless. That also means, in some cases, if participant 123 is not viewing the position of participant 122, participant 122 will not be shown in the AR video. Likewise, if participant 122's position is only partway visible, then the AR video will only show part of participant 122 accordingly.

In some configurations, audio playback devices at the meeting location may be used to emulate the origin position of audio captured by capture system 102 in conjunction with the video of participant 122. That is, conferencing system 101 will select an audio device that is able to playback the captured audio and make it seem as though the audio is coming from the determined position of participant 122 in the meeting location. Thus, not only will AR HMD 103 make it look to participant 123 that participant 122 is at a particular location but the audio device will also make it sound like participant 122 is speaking from that location. In some examples, the audio device is located near the determined position of participant 122 while, in other examples, audio devices not near the determined positions, such as devices built into HMD 103, are used to simulate to the best of their ability the audio coming from the position of participant 122.

In some embodiments, another capture system captures participant 123 and participant 123 is presented to participant 122 through an AR HMD worn by participant 122 in a mirror of operation 200. Accordingly, conferencing system 101 is able to emulate participant 122 at the meeting location with participant 123 and emulate participant 123 at participant 122's location. Furthermore, additional participants may be at either location (or additional locations not mentioned) and those additional participants are further emulated in the AR HMDs of other participants not co-located.

In further embodiments, conferencing system 101 may be configured to record the meeting between participants to a storage system so that the meeting can be played back at a later time. This recording may be from the view point of participant 123, the view point of another participant at the meeting location, the view point of a "fly on the wall" overlooking the entire meeting location, or otherwise, and includes both the participants at the meeting location (e.g. participant 123) and remote participants (e.g. participant 122) in their positions determined by conferencing system 101. The recorded meeting may be played back in an AR HMD without the meeting location background, in a Virtual Reality (VR) HMD that further presents the meeting room features in an immersive visual environment, on a two-dimensional display screen, with audio only, or by any other method of playback. In some cases, the images may need to be translated into a format appropriate for viewing on the playback display. For example, if remote participants, such as participant 122, are captured in three-dimensional video, then that video may need to be translated into two dimensions and into a file format capable of two-dimensional playback.

Figure 3:
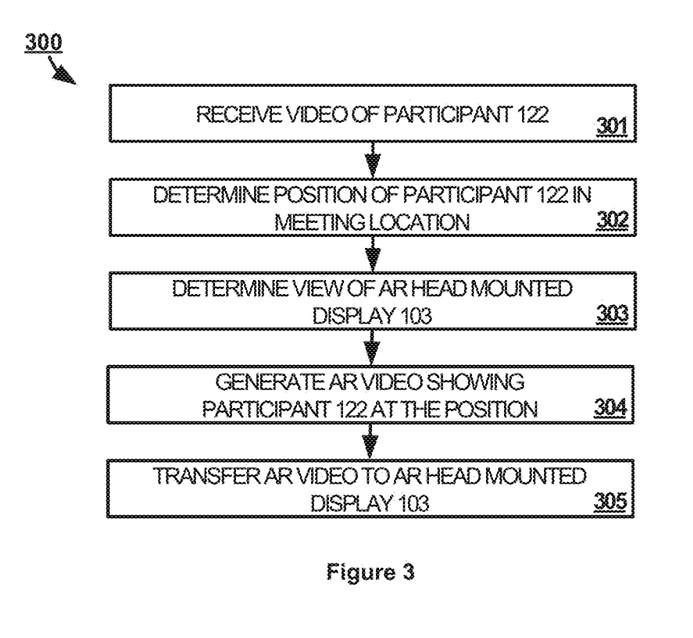
FIG. 3 illustrates a method of operating a conferencing system for facilitating enhanced visual communication between remote participants.

FIG. 3 illustrates a method of operating conferencing system 101 in an example of facilitating enhanced visual communication between remote participants. During a conference session, conferencing system 101 receives first video captured of participant 122 remote to a physical meeting location (step 301). Conferencing system 101 determines a first position for the first participant in the physical meeting location (step 302) and determines a view of AR HMD 103 worn by participant 123 at the physical meeting location (step 303). From the first video, conferencing system 101 generates AR video that makes participant 122 appear to participant 123 at the first position when viewed through AR HMD 103 (step 304). Conferencing system 101 then transfers the AR video to AR HMD 103 for presentation to participant 123 (step 305).

As noted in operation 200, conferencing system 101 may perform the same functions for presenting participant 123 to participant 122 and may perform the same functions for more than two participants. Likewise, not all of steps 301-305 need to occur in that order. For example, the first position may be determined before the conference session begins.

Referring back to FIG. 1, Conferencing system 101 comprises a computer processing system and communication interface. Conferencing system 101 may also include other components such as a router, server, data storage system, and power supply. Conferencing system 101 may reside in a single device or may be distributed across multiple devices. Conferencing system 101 could be an application server, personal workstation, or any other type of computing system capable of facilitating a multiparty conference—including combinations thereof.

Participant capture system 102 comprises one or more cameras for capturing participant 122 and communication circuitry for communicating with conferencing system 101. Capture system 102 may also include one or more microphones for capturing audio, a power supply, processing circuitry, or other components. Capture system 102 may reside in a single device or may be distributed across multiple devices. For example, capture system 102 may comprise separate camera and microphone components for capturing participant 122. In some examples, capture system 102 may include motors allowing system 102 to rotate, pan, or tilt. Capture system 102 may also include 3D capture and registration capabilities, such as depth or stereo sensing.

AR HMD 103 comprises a frame for participant 123 to wear HMD 103 on their head. Typically, AR HMD 103 will generally take the form of a pair of eyeglasses. HMD 103 further comprises a personal display for displaying video images to participant 123. The display may comprise an image projector that projects images onto lenses of HMD 103 or may be a display, such as an LCD, built into or in place of the lenses. HMD 103 further includes processing and communication circuitry and may include audio playback components, such as speakers or headphones. Additionally, HMD 103 may include video and audio capture components, such as a camera and a microphone.

Communication links 111 and 112 use metal, glass, air, space, or some other material as the transport media. Communication links 111 and 112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111 and 112 could be direct links or may include intermediate networks, systems, or devices.

Figure 4:
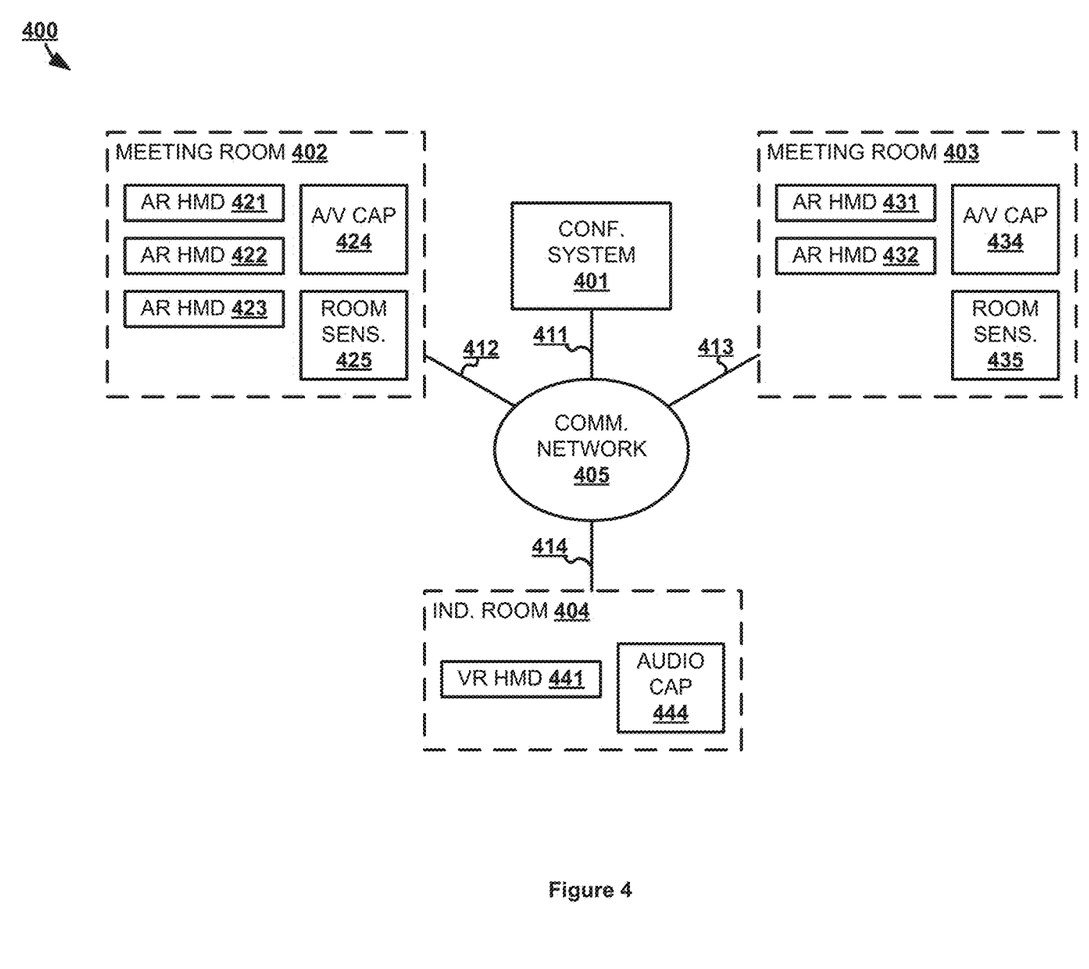
FIG. 4 illustrates a conferencing environment for facilitating enhanced visual communication between remote participants.

FIG. 4 illustrates conferencing environment 400. Conferencing environment 400 includes conferencing system 401, meeting room 402, meeting room 403, individual room 404, and communication network 405. Meeting room 402 includes AR HMDs 421-423, audio/video capture devices 424, and room sensors 425. Meeting room 403 includes AR HMDs 431-432, audio/video capture devices 434, and room sensors 435. Individual room 404 includes Virtual Reality (VR) HMD 441 and audio capture 444. Communication network 405 communicates with conferencing system 401, meeting room 402, meeting room 403, and individual room 404 over communication links 411-414, respectively.

Communication network 405 comprises network elements that provide communications services to rooms 402-404 and conferencing system 401. Communication network 405 may comprise switches, wireless access nodes, Internet routers, network gateways, application servers, computer systems, communication links, or some other type of communication equipment—including combinations thereof. While shown as a single network, communication network 405 may comprise a collection of networks including local area networks, wide area networks, the Internet, or any other type of computing network—including combinations thereof.

VR HMD 441 comprises a frame for a participant to wear HMD 441 on their head in a similar manner to an AR HMD described above. HMD 441 further comprises a personal display for displaying video images to participant 123. The display may comprise a display, such as an LCD, built in place of lenses and positioned in the HMD such that the participant sees little, if any, of the physical scene around them. Accordingly, VR HMD 441 immerses the participant in the displayed visuals. HMD 441 further includes processing and communication circuitry and may include audio playback components, such as speakers or headphones. Additionally, HMD 441 may include video and audio capture components, such as a camera or a microphone.

Audio/video capture devices 424 and 434 comprise components, such as 2D or 3D cameras and microphones, that are used to capture video an audio of meeting rooms 402 and 403 and the participants located therein. A/V capture devices 424 and 434 may further include circuitry for wired or wireless networking, such as an Ethernet interface, Wi-Fi interface, Bluetooth module, or other type of communication interface. In some examples, certain components of A/V capture devices 424 and 434 may be included in AR HMDs 421-423 and 431-432.

Room sensors 425 and 435 include components that capture information used to determine participant position and view. Sensors 425 and 435 may include proximity sensors, RFID tags, infrared tags, compasses, sonic sensors, accelerometers, gyro sensors, or any other components that may provide relevant information. At least some of the components of sensors 425 and 435 may be incorporated into HMDs 421-423 and 431-432 and A/V capture devices 424 and 434.

In some examples, each of rooms 402-404 may further include an intermediate computer system that communicates with each rooms HMDs, A/V capture devices, and room sensors. The intermediate computer systems then communicate with conferencing system 401. In some configurations, some of the functions performed by conferencing system 401 may be handled by these intermediate computer systems on behalf of conferencing system 401.

Figure 5:
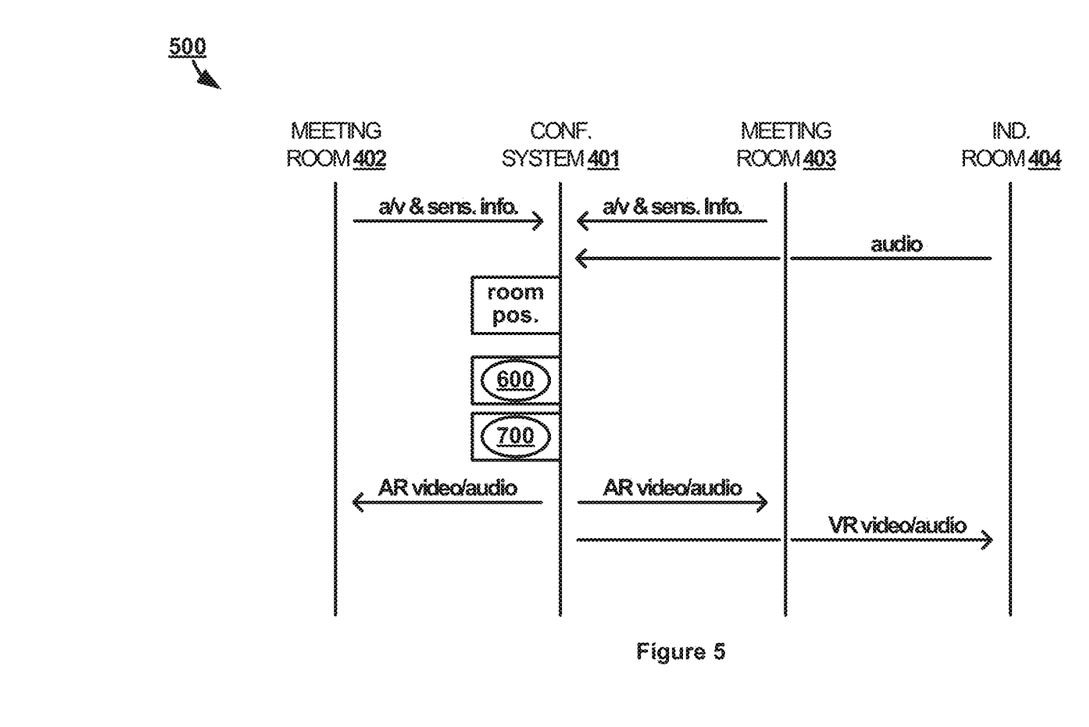
FIG. 5 illustrates an operational scenario of a conferencing environment for facilitating enhanced visual communication between remote participants.

FIG. 5 is a sequence diagram illustrating an operational scenario 500 to facilitate enhanced visual communication between remote participants. In scenario 500, a conference session is initiated and conferencing system 401 begins to receive captured audio and video from A/V capture devices 424 and 434 along with sensor information from room sensors 425 and 435. Additionally, in this example, only audio is received from audio capture device 444 at individual room 404. However, in other examples, video may be captured of a participant wearing VR HMD 441 for presentation to the participants in meeting rooms 402 and 403.

Conferencing system 401 then uses the received audio, video, and sensor information to determine positions within each meeting room 402 and 403 in which remote participants will be viewed through HMDs. In particular, conferencing system 401 determines positions within meeting room 402 at which the representations of participants wearing HMDs 431, 432, and 441 will be displayed. Likewise, conferencing system 401 determines positions within meeting room 403 at which the representations of participants wearing HMDs 421-423 and 441 will be displayed.

Additionally, conferencing system 401 determines a position and view in which the participant of VR HMD 441 will be participating in the conference session. The VR participants may view the conference from a VR position within meeting room 402, 403, or within a virtual meeting room representation into which representations of participants of meeting rooms 402 and 403 are placed. The VR participant will then be presented with the background of the selected meeting room in addition to the representations of participants at meeting room 402-403 as part of a virtual reality meeting experience.

In some examples, this position determination step may be repeated during the conference if the position of one or more participants needs to be changed. For instance, more participants may be in the conference session than there are positions for those participants in a given physical meeting room. Accordingly, only certain participants, such as the most recent speakers, may be displayed to participants in a physical meeting room. When a new speaker talks, that speaker may take the position of a speaker that has not talked for a while.

Figure 6:
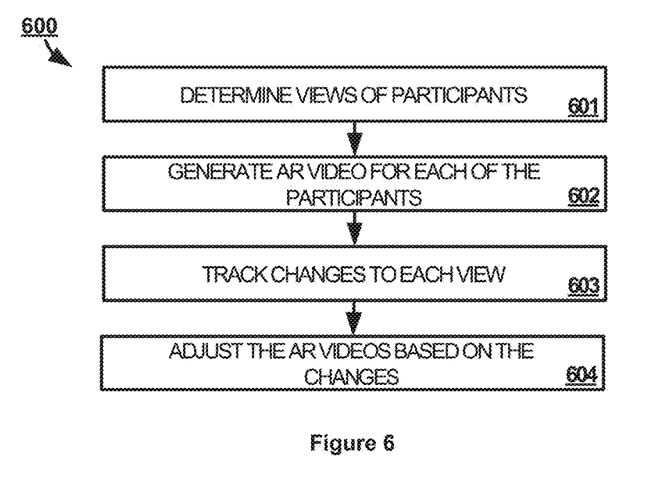
FIG. 6 illustrates a method for facilitating enhanced visual communication between remote participants in the operational scenario.
Figure 7:
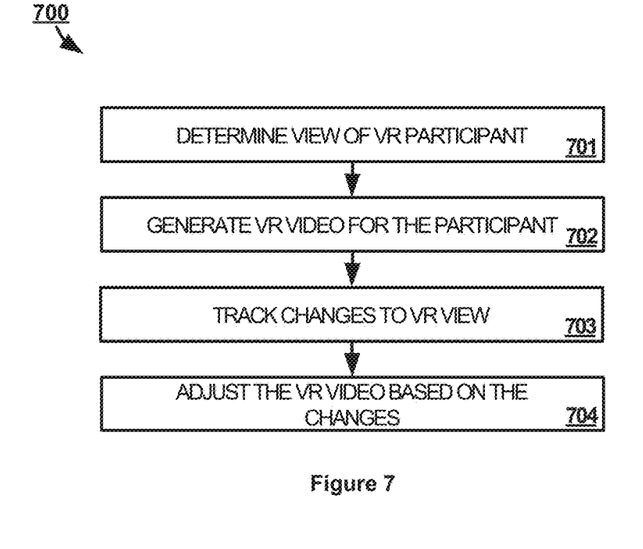
FIG. 7 illustrates a method for facilitating enhanced visual communication between remote participants.

Once positions have been determined, operations 600 and 700 are performed to generate video for display by AR HMDs 421-423 and 431-432 and VR HMD 441. FIG. 6 illustrates operation 600 for generating AR video while operation 700 generates VR video.

In operation 600, conference system 401 determines views from each of AR HMDs 421-423 and 431-432 (step 601). The views are determined from video captured by each of the AR HMDs and room sensor information from sensors 425 and 435. The views are determined so that the video of the other participants can be presented in the AR HMDs at the determined locations relative to the current view of the AR HMD.

AR video is then generated for each AR HMD 421-423 and 431-432 (step 602). Each AR HMD's video includes representations of the other participants not physically located in the same room. In some examples, each video may include all remote participants currently within view at their current positions such that each respective AR HMD simply displays the video. In other examples, video for each remote participant in the view is generated and the position of the video for each remote participant is tagged such that the displaying AR HMD displays each participant video at a position in accordance with the tag. Other variations of generating AR video may also be used.

Conferencing system 401 continues to track changes to the views from each AR HMD (step 603). The view changes are tracked based on subsequent sensor information and video from the AR HMDs that result in updated views from each AR HMD. For example, each participant will likely turn their respective head, or otherwise move, such that the participant's view changes and, therefore, the position of each remote participant relative to the change in view also changes. Based on the view changes, the AR video for each AR HMD is adjusted to account for the change in view (step 604). That is, the remote participants displayed in the AR video may need to be adjusted in order to remain in their determined positions relative to the perspective of the changed view. The adjustments occur very fast so that the AR participant does not see a remote participant "jump" to maintain position when the AR participant moves his or her head.

FIG. 7 illustrates operation 700 for generating VR video concurrently with operation 600 generating AR video. In operation 700, a view of VR HMD 441 is determined (step 701). Since VR HMD 441 is not located in a meeting room, the view comprises the scene of the meeting room that will be presented by VR HMD 441 from the perspective of the position determined for the VR participant by conferencing system 401 based on the current position VR HMD 441 (e.g. caused by head tilt, head turning, etc.) to its participant. As noted above, the view may be video captured of meeting room 402, meeting room 403, or of some other virtual meeting room graphically generated by conferencing system 401.

VR video is then generated to form the determined view including video representations of any participants not physically in the room captured for the view (step 702). For example, if meeting room 402 is used as the room presented by VR HMD 441, then, depending on the angle of the view, participants of AR HMDs 421-423 are already captured in the video. Video captured of participants in meeting room 403, if their position is included in the current view, is overlaid into the VR video at their determined positions in room 402. Thus, the VR video will look to a VR participant very similar to the view that participant would have if he or she were an AR participant within room 402. The difference being that the physical meeting room itself, and the physical participants therein, would be viewed directly through transparent lenses rather than being reproduced via VR HMD 441. In another example, if the meeting room in the VR video comprises a virtual meeting room generated by conferencing system 401, then the participants in meeting rooms 402 and 403 will all need to be overlaid into their determined positions within that virtual meeting room.

Conferencing system 401 then tracks changes to the view of VR HMD 441 as the conference session proceeds (Step 703). These changes are tracked based on sensor information received from VR HMD 441 and may indicate that the participant has tilted, turned, or otherwise moved his or her head. The VR video is then adjusted based on these tracked changes (step 704). That is, the VR video will display whichever part of the meeting room scene corresponds to the participant's current head position. For example, if the participant moves their head from left to right, then the view displayed by the VR video will pan from left to right as smoothly as possible and place any remote participants in their correct positions within the displayed room. This process effectively provides the VR participant with a visual experience akin to being in the room with the other participants.

Referring back to FIG. 5, once the AR and VR video has been generated, the AR video is transferred to AR HMDs 421-423 and 431-432 at meeting rooms 402 and 403 and the VR video is transferred to VR HMD 441 at independent room 404. AR HMDs 421-423 and 431-432 and VR HMD 441 then present the received video to their respective wearers. Likewise, audio corresponding to the AR and VR video is transferred with or included in the AR and VR video to each HMD. The audio may be presented in the by the receiving HMD itself or presented by other audio devices within rooms 402-404. In a particular example, audio representing the voice of a remote participant in the video may be presented from a speaker positioned in the room to simulate the audio originating from the speaker's position in the room. The steps of FIG. 5 occur continually in order to facilitate a real-time communications between all the participants wearing the HMDs.

Figure 8:
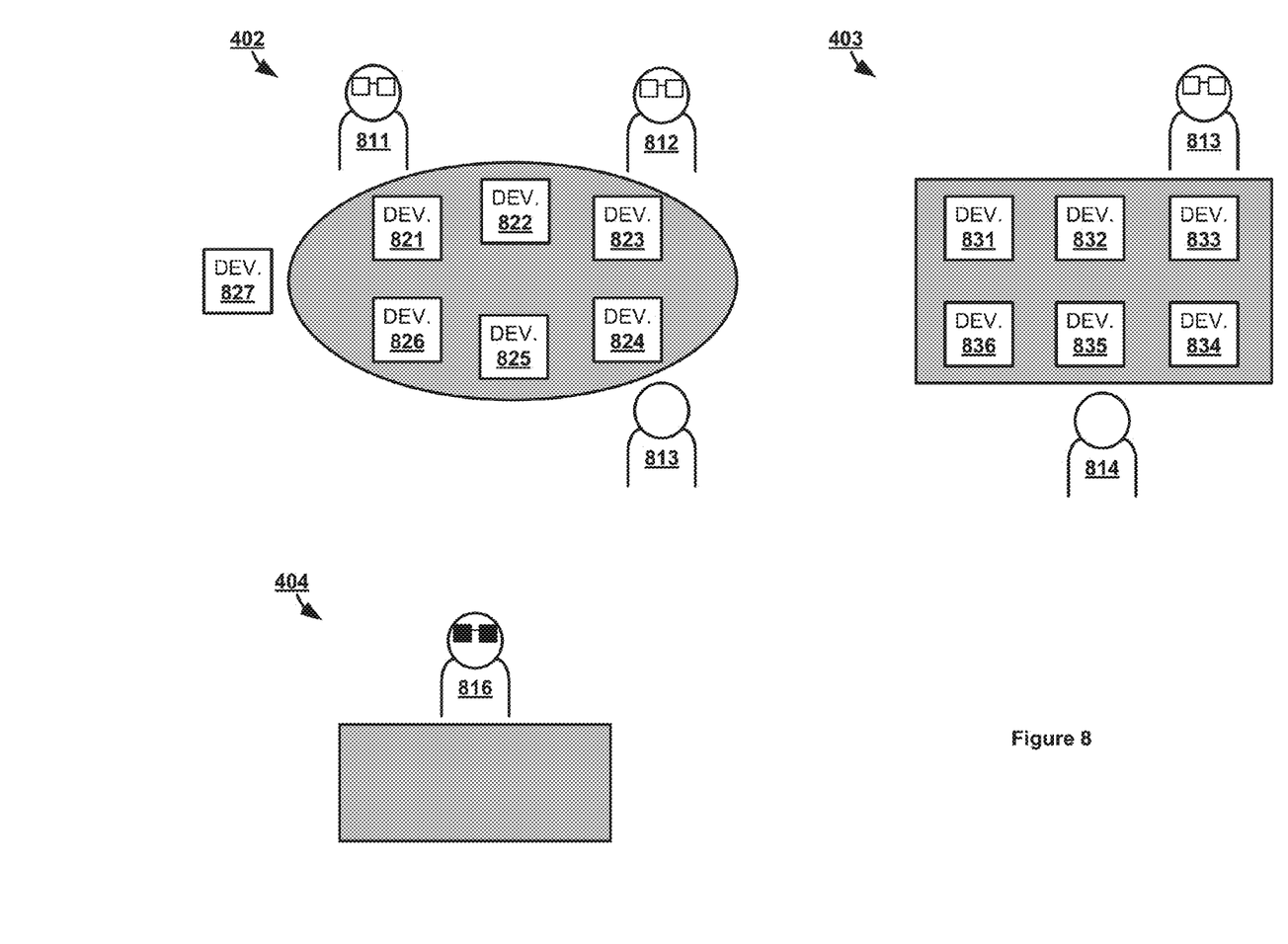
FIG. 8 illustrates example room orientations when facilitating enhanced visual communication between remote participants.

FIG. 8 illustrates an example orientation of participants within rooms 402-404. In particular, meeting room 402 includes participants 811-813 who are wearing AR HMDs 421-423, respectively. Meeting room 403 includes participants 814 and 815 who are wearing AR HMDs 421-423, respectively. Independent room 404 includes participant 816 wearing VR HMD 441. In this example, meeting room 402 includes a conference table having six seating positions with a device 821-826 at each position. Each device 821-826 includes components of A/V capture devices 424 and room sensors 425. Meeting room 403 includes a conference table also having six seating positions with a device 831-836 at each position. Each device 831-836 includes components of A/V capture devices 434 and room sensors 435. Furthermore, in this example, audio capture device 444 is incorporated into VR HMD 441.

In operation, devices 822, 825, 826, 831, 832, 834, and 836 do not have participants at their positions and, therefore, may not capture any audio or video information for a conference session. However, these devices may still capture other information used for determining views and transfer that information to conferencing system 401. In contrast, devices 821, 823, 824, 833, and 835 all have participants at their respective locations. Accordingly, once the conferencing session has started, these devices begin capturing audio and video of their respective participants and transferring that captured audio and video to conferencing system 401. Additionally, each of AR HMDs 421-423 and 431-432 includes outward facing video cameras that capture and transfer video to conferencing system 401, which uses the video to determine a view of each participant. Moreover, capture device 827 captures video of meeting room 402 for use in VR video and provide the visual prospective of the conference for participant 816 through VR HMD 441.

Capture devices other than those at the positions of the meeting participants may also capture video of the participants to provide desired video angles to remote participants. For example, a capture device may be used that can best capture the angle of a physical participant corresponding to the angle in which a remote participant is viewing the physical participant. More specifically, if a remote participant is viewing the meeting from the empty position next to device 822, then device 822 will be used to capture meeting room 402 for that participant. Furthermore, multiple capture devices, including device 827 or other devices not shown, may be used to ensure video is captured from as many relevant angles as possible.

Upon receiving the audio, video, and other sensor information, conferencing system 401 performs the operations described in FIGS. 5-7 above. Those operations allow conferencing system 401 to provide AR and VR video necessary for participants 811-813, 814-815, and 816 all experience the conference session as though they are all in the same room.

Figure 9:
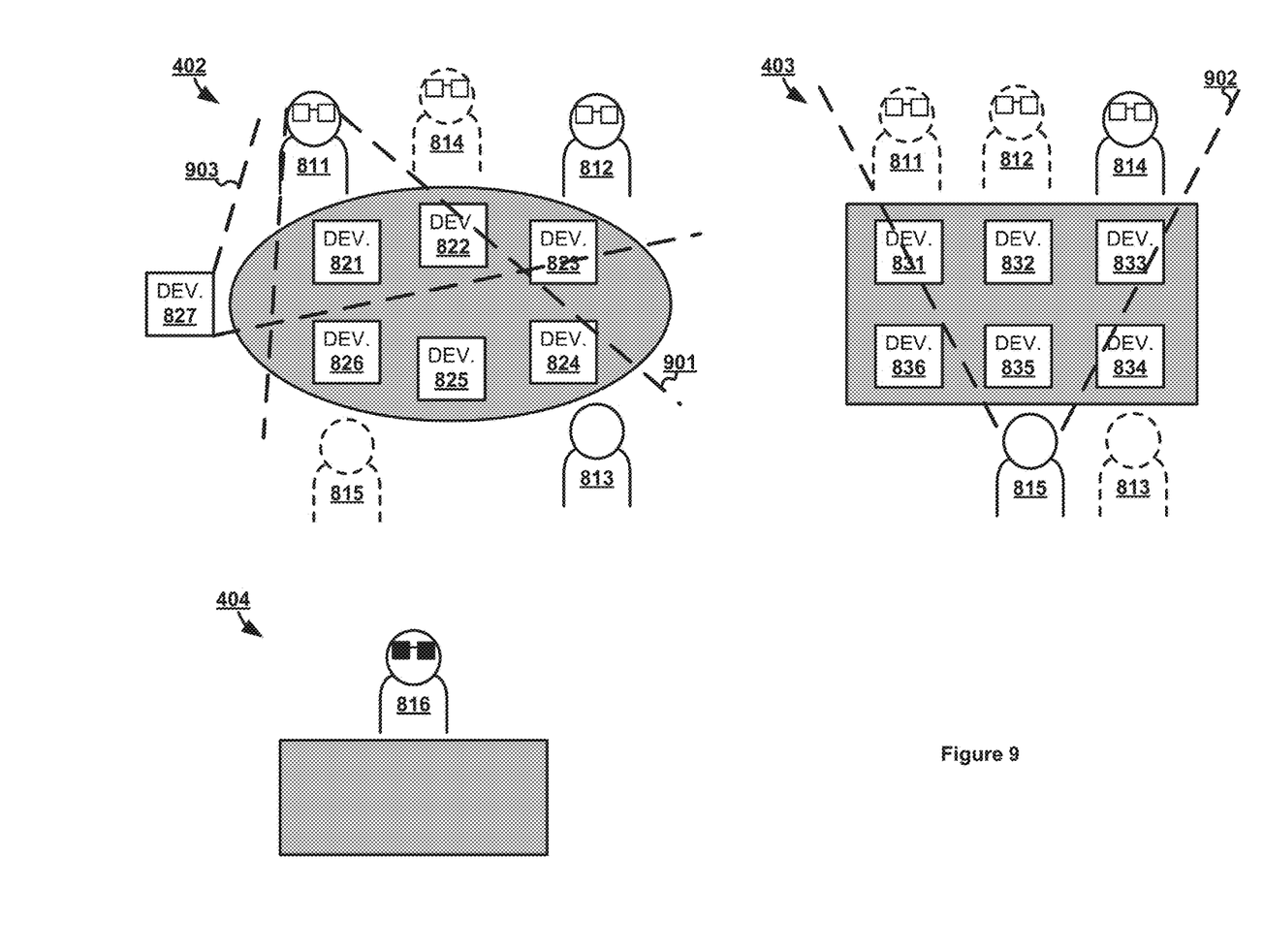
FIG. 9 illustrates example room orientations when facilitating enhanced visual communication between remote participants.

FIG. 9 illustrates an example orientation of participants within rooms 402-404 once the participants are viewing the conference session through video provided by conferencing system 401. Specifically, as shown, conferencing system 401 has determined positions within each room 402 and 403 for the participants remote to each room. No position was determined for participant 816 in this example because no video was captured of participant 816, although, audio from participant 816 may be presented from a particular position. However, in some examples, video may be captured of participant 816 and, therefore, the open spot in each of rooms 402 and 403 may be taken by participant 816. Alternatively, participant 816 may be represented by an avatar or other graphical representation in place of real-time video of participant 816.

When viewed through their AR HMDs, participants 811-813 at room 402 are able to see video of participants 814-815 at positions in room 402 as though participants 814-815 are located in room 402. Likewise, participants 814-815 at room 403 are able to see video of participants 811-813 at positions in room 403 as though participants 811-813 are located in room 403. In a particular example, view 901 is what participant 811 sees through their AR HMD 421. Even though the position of participant 815 is physically empty, the AR video presented to participant 811 makes it seem as though participant 815 is at that position. Similarly, view 902 is what participant 815 sees through their AR HMD 432. Even though the positions of participants 811 and 812 are physically empty, the AR video presented to participant 815 makes it seem as though participants 811 and 812 are at those positions.

As views 901 and 902 change (e.g. as participants 811 and 815 tilt or pan their heads), conferencing system 401 tracks those view changes and adjusts the AR video for each participant accordingly to ensure the remote participants continue to be presented in their correct positions. As such, in the case of view 901, as participant 811 turns their head more to the left, the AR video may no longer present participant 815 since participant 815 moves out of view and presents participant 814 "sitting" next to participant 811 as participant 814 moves into view.

Regarding participant 816, the VR video presented to participant 816 comprises view 903 captured by device 827. Overlaid by conferencing system 401 into view 903 is the video of participant 814 such that it looks as though participant 814 is sitting between participants 811 and 812 in room 402. As participant 816 moves their head to the right, view 903 changes and participant 813 comes into view as captured by device 827. Additionally, further to the right, video of participant 815 is further overlaid into the VR video such that participant 816 is able to see participant 815 as though participant 815 is in room 432. Device 827 may need to move itself to capture view 903 in accordance with participant 816's head movements or device 827 may capture video wide enough that conferencing system 401 merely needs to move the view within the already captured video to generate the VR video for participant 816.

Additionally, to increase the effectiveness of the AR video, audio from each remote participant is played from the device at that participant's position. For example, if participant 814 is speaking, then device 822 will present the audio of participant 814 so that participants 811-813 hear participant 814 as though participant 814 is actually at the position in room 402 presented in the AR video. Any device in rooms 402 and 403 may present the audio captured for participant 816. However, if a position is determined for participant 816 in either or both of rooms 401 and 403, then the audio may be presented as though it comes from that determined position.

It should be further noted that meeting rooms 402 and 403 both likely contain objects, including the physical participants themselves, that could obscure the view of other participants. Therefore, in order to best emulate a remote participant being physically located within the room, video of the remote participants must account for those objects. For example, device 826 may obscure the view of remote participant 815 in view 901. The AR video of remote participant 815 is accordingly generated such that it looks in view 901 to participant 811 as though participant 815 is behind device 826 just like it would if participant 815 where physically in room 402.

In some examples, conferencing system 401 may further insert presentation information into the AR and VR video viewed by each participant. For example, the information may include presentation slides that seem to be projected onto a wall or table/desk of meeting room 402 or 403 from being overlaid into the AR or VR video. Alternatively, the information could be presented in a manner independent of any physical features. Likewise, other information may be included by conferencing system 401 into the AR and VR video, such chat windows, contextual information related to the conference session, or any other visual information that a participant may find useful.

Figure 10:
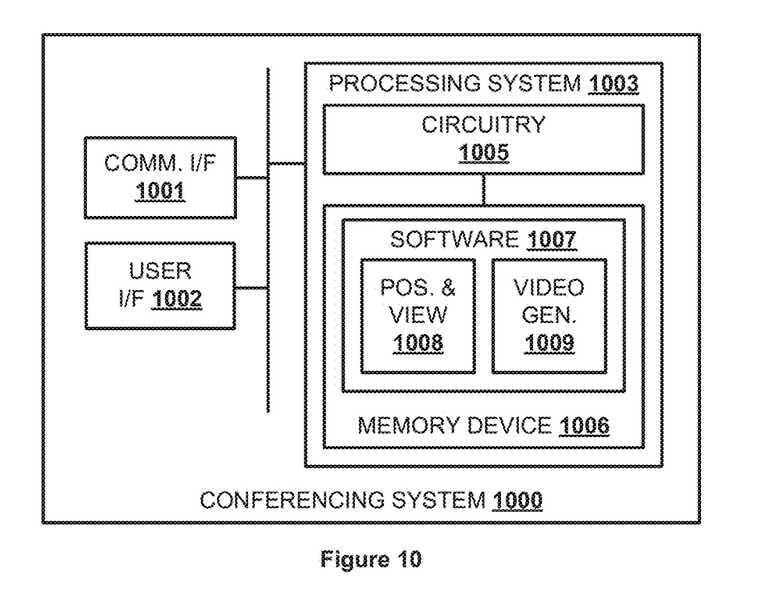
FIG. 10 illustrates a conferencing system for facilitating enhanced visual communication between remote participants.

FIG. 10 illustrates conferencing system 1000. Conferencing system 1000 is an example of conferencing system 101, although system 101 could use alternative configurations. Conferencing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007. Conferencing system 1000 may include other well-known components such as a battery and enclosure that are not shown for clarity. Conferencing system 1000 may be a personal computer, server, or some other computing apparatus—including combinations thereof. In some examples, conferencing system 1000 may be replicated across multiple locations in order to distribute the processing load required to function as described herein.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user to receive user inputs and to present media and/or information. User interface 1002 may include a speaker, microphone, buttons, lights, display screen, touch screen, touch pad, scroll wheel, communication port, or some other user input/output apparatus—including combinations thereof. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Processing circuitry 1005 is typically mounted on a circuit board that may also hold memory device 1006 and portions of communication interface 1001 and user interface 1002. Operating software 1007 comprises computer programs, firmware, or some other form of machine-readable processing instructions. Operating software 1007 includes position and view determination module 1008 and video generation module 1009. Operating software 1007 may further include an operating system, utilities, drivers, network interfaces, applications, or some other type of software. When executed by processing circuitry 1005, operating software 1007 directs processing system 1003 to operate conferencing system 1000 as described herein.

In particular, operating software 1007 directs processing system 1003 to, during a conference session, receive first video captured of a first participant remote to a physical meeting location. Position and view determination module 1008 directs processing system 1003 to determine a first position for the first participant in the physical meeting location and determine a view of an Augmented Reality (AR) head mounted display worn by a second participant at the physical meeting location. Video generation module 1009 directs processing system 1003 to, from the first video, generating AR video that makes the first participant appear to the second participant at the first position when viewed through the AR head mounted display and to transfer the AR video to the AR head mounted display for presentation to the second participant.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer readable storage medium having instructions stored thereon for facilitating enhanced visual communication between remote participants that, when executed by a conferencing system, direct the conferencing system to:
   during a conference session, receive first video captured of a first participant remote to a physical meeting location;
   identify one or more available physical participant positions in the physical meeting location, wherein an available physical participant position comprises a position at the physical meeting location where a participant at the physical meeting location could be positioned but is not when determining the first position;
   determine a first position for the first participant from the one or more available physical participant positions in the physical meeting location;
   determine a view of an Augmented Reality (AR) head mounted display worn by a second participant at the physical meeting location;
   from the first video, generate AR video that makes the first participant appear to the second participant as though the first participant is physically at the first position when viewed through the AR head mounted display; and
   transfer the AR video to the AR head mounted display for presentation to the second participant.

2. The non-transitory computer readable medium of claim 1, wherein the instructions further direct the conferencing system to:
   receive second video captured of the physical meeting location;
   receive a second position in the physical meeting location for a third participant remote to the physical meeting location;
   from the first video and the second video, generate Virtual Reality (VR) video that presents the physical meeting room with the first participant at the first position from a view point of the second position; and
   transfer the VR video to a VR head mounted display worn by the third participant for presentation to the third participant.

3. The non-transitory computer readable medium of claim 2, wherein the instructions that direct the conferencing system to generate the AR video include instructions that direct the conferencing system to make a representation of the third participant appear to the second participant at the second position when viewed through the AR head mounted display.

4. The non-transitory computer readable medium of claim 1, wherein the instructions further direct the conferencing system to:
receive first audio captured of the first participant in conjunction with the first video;
transfer the first audio to an audio device at the physical meeting location, wherein the audio device presents the first audio such that the second participant hears audio as coming substantially from the first position.

5. The non-transitory computer readable medium of claim 1, wherein the instructions that direct the conferencing system to determine the view of the AR head mounted display comprise instructions that direct the conferencing system to:
receive orientation information from the AR head mounted display;
receive position information about the second participant from sources external to the AR head mounted display;
identify the view of the AR head mounted display based on the orientation information and the position information.

6. The non-transitory computer readable medium of claim 5, wherein the instructions that direct the conferencing system to determine the view of the AR head mounted display further comprise instructions that direct the conferencing system to:
receive subsequent orientation information and subsequent position information; and
update the view of the AR head mounted display based on the subsequent orientation information and the subsequent position information.

7. The non-transitory computer readable medium of claim 1, wherein the instructions further direct the conferencing system to:
record the conference session from at least one of the view of the AR head mounted display and another view of the physical meeting location.

8. The non-transitory computer readable medium of claim 7, wherein the instructions further direct the conferencing system to:
translate the recording into a format viewable on a non-head mounted display.

9. The non-transitory computer readable medium of claim 1, wherein the instructions that direct the conferencing system to generate the AR video comprise instructions that direct the conferencing system to:
overlay additional visual information associated with the conference session such that the additional visual information appears to the second participant at a position within the physical meeting location when viewed through the AR head mounted display.

10. A conferencing system for facilitating enhanced visual communication between remote participants, the conferencing system comprising:
a communication interface configured to, during a conference session, receive first video captured of a first participant remote to a physical meeting location;
processing circuitry configured to identify one or more available physical participant positions in the physical meeting location, wherein an available physical participant position comprises a position at the physical meeting location where a participant at the physical meeting location could be positioned but is not when determining the first position, determine a first position for the first participant from the one or more available physical participant positions in the physical meeting location, determine a view of an Augmented Reality (AR) head mounted display worn by a second participant at the physical meeting location, and, from the first video, generate AR video that makes the first participant appear to the second participant as though the first participant is physically at the first position when viewed through the AR head mounted display; and
the communication interface configured to transfer the AR video to the AR head mounted display for presentation to the second participant.

11. The conferencing system of claim 10, further comprising:
the communication interface configured to receive second video captured of the physical meeting location;
the processing circuitry configured to determine a second position in the physical meeting location for a third participant remote to the physical meeting location and, from the first video and the second video, generate Virtual Reality (VR) video that presents the physical meeting room with the first participant at the first position from a view point of the second position; and
the communication interface configured to transfer the VR video to a VR head mounted display worn by the third participant for presentation to the third participant.

12. The conferencing system of claim 11, wherein the processing circuitry configured to generate the AR video comprises the processing circuitry configured to make a representation of the third participant appear to the second participant at the second position when viewed through the AR head mounted display.

13. The conferencing system of claim 10, further comprising:
the communication interface configured to receive first audio captured of the first participant in conjunction with the first video and transfer the first audio to an audio device at the physical meeting location, wherein the audio device presents the first audio such that the second participant hears audio as coming substantially from the first position.

14. The conferencing system of claim 10, wherein the processing circuitry configured to determine the view of the AR head mounted display comprises the processing circuitry configured to:
receive orientation information from the AR head mounted display via the communication interface;
receive position information about the second participant from sources external to the AR head mounted display via the communication interface;
identify the view of the AR head mounted display based on the orientation information and the position information.

15. The conferencing system of claim 14, wherein the processing circuitry configured to determine the view of the AR head mounted display comprises the processing circuitry configured to:
receive subsequent orientation information and subsequent position information via the communication interface; and
update the view of the AR head mounted display based on the subsequent orientation information and the subsequent position information.

16. The conferencing system of claim 10, further comprising:
a storage system configured to record the conference session from at least one of the view of the AR head mounted display and another view of the physical meeting location.

17. The conferencing system of claim 16, further comprising:
translating the recording into a format viewable on a non-head mounted display.

18. The conferencing system of claim 10, wherein the processing circuitry configured to generate the AR video comprises the processing circuitry configured to:
overlay additional visual information associated with the conference session such that the additional visual information appears to the second participant at a position within the physical meeting location when viewed through the AR head mounted display.

* * * * *